US012407643B2

(12) United States Patent
Patange et al.

(10) Patent No.: US 12,407,643 B2
(45) Date of Patent: Sep. 2, 2025

(54) HANDLING RAW DNS QUERIES IN DNS CLIENT

(71) Applicant: MICROSOFT TECHNOLOGY LICENSING, LLC, Redmond, WA (US)

(72) Inventors: Aditi Pravin Patange, Bellevue, WA (US); Milan Crowley Justel, Kirkland, WA (US); Alexandru Jercaianu, Redmond, WA (US); Matthew Raymond Cox, Bothell, WA (US); Ivan Dimitrov Pashov, Woodinville, WA (US)

(73) Assignee: Microsoft Licensing Technology, LLC, Redmond, WA (US)

( * ) Notice: Subject to any disclaimer, the term of this patent is extended or adjusted under 35 U.S.C. 154(b) by 0 days.

(21) Appl. No.: 18/589,137

(22) Filed: Feb. 27, 2024

(65) Prior Publication Data

US 2025/0158958 A1    May 15, 2025

Related U.S. Application Data

(60) Provisional application No. 63/598,001, filed on Nov. 10, 2023.

(51) Int. Cl.
*H04L 61/4511* (2022.01)
*H04L 61/10* (2022.01)
(Continued)

(52) U.S. Cl.
CPC ......... *H04L 61/4511* (2022.05); *H04L 61/58* (2022.05)

(58) Field of Classification Search
CPC .. H04L 61/4511; H04L 61/58; H04L 61/1511; H04L 61/10; H04L 61/103; H04L 29/12; H04L 29/08

(Continued)

(56) References Cited

U.S. PATENT DOCUMENTS 7,228,417 B2 *   6/2007   Roskind .................. G06F 21/31
                                                                  713/168
7,296,155 B1    11/2007   Trostle et al.
(Continued)

FOREIGN PATENT DOCUMENTS

WO    2007035544 A2    3/2007
WO    2014142983 A1    9/2014

OTHER PUBLICATIONS

"Oracle VM VirtualBox—User Manual (Version 5.0.4)", Retrieved From: https://web.archive.org/web/20151205165906/ http://download. virtualbox.org/virtualbox/5.0.4/UserManual.pdf, Dec. 5, 2015, 322 Pages.

(Continued)

*Primary Examiner* — Jude Jean Gilles
(74) *Attorney, Agent, or Firm* — Tyler Thorp; Newport IP, LLC

(57) ABSTRACT

Methods and apparatuses for handling raw DNS queries or DNS queries that generate responsive DNS records from a DNS server that are not recognized or decodable by a DNS client are described. The DNS client may receive a DNS query from an application and provide a numerical IP address and one or more DNS records for a given domain name to the application. In some cases, a DNS client provides an interface that enables the application to send and receive DNS queries and responses to DNS queries that use DNS functionalities and customizations that are not recognized by the DNS client. This capability allows the application to craft its own DNS queries to send and receive resulting response bytes or packets through the DNS client, while allowing the DNS queries to pass through the DNS client to make use of host system cache, policies, and settings.

20 Claims, 9 Drawing Sheets

(51) Int. Cl.
*H04L 61/103* (2022.01)
*H04L 61/58* (2022.01)
*H04L 29/08* (2006.01)
*H04L 29/12* (2006.01)

(58) Field of Classification Search
USPC .......................................................... 709/245
See application file for complete search history.

(56) References Cited

U.S. PATENT DOCUMENTS

| | | |
|---|---|---|
| 9,237,087 B1 | 1/2016 | Risbood |
| 10,944,714 B1 | 3/2021 | Cosma |
| 11,019,022 B1 | 5/2021 | Thornewell |
| 11,489,814 B1 | 11/2022 | Engskow |
| 2009/0327517 A1 | 12/2009 | Sivasubramanian |
| 2010/0050173 A1 | 2/2010 | Hensbergen |
| 2015/0220943 A1* | 8/2015 | Dossick ................ H04L 67/303 705/7.29 |
| 2018/0157524 A1 | 6/2018 | Saxena |
| 2019/0158457 A1* | 5/2019 | Donaldson .......... H04L 61/5076 |
| 2019/0158459 A1 | 5/2019 | Vaikar |
| 2019/0306188 A1* | 10/2019 | Medvedovsky .... H04L 63/1425 |
| 2019/0342397 A1 | 11/2019 | Laibson |
| 2021/0049049 A1 | 2/2021 | Kuik |
| 2022/0004623 A1 | 1/2022 | Trabelsi |
| 2023/0418647 A1 | 12/2023 | Horton |

OTHER PUBLICATIONS

Gerend, et al., "DNS Policies Overview", Retrieved From: https://learn.microsoft.com/en-us/windows-server/networking/dns/deploy/dns-policies-overview, Jun. 24, 2022, 13 Pages.

International Search Report and Written Opinion issued in PCT Application No. PCT/US23/022466, Mailed Date: Jul. 21, 2023, 12 Pages.

Non-Final Office Action mailed on Nov. 6, 2024, in U.S. Appl. No. 17/852,171, 41 pages.

Final Office Action mailed on Jul. 11, 2025, in U.S. Appl. No. 17/852,171, 45 pages.

* cited by examiner

HANDLING RAW DNS QUERIES IN DNS CLIENT

CLAIM OF PRIORITY

This application claims the benefit of and priority to U.S. Provisional Application No. 63/598,001, filed Nov. 10, 2023, which is herein incorporated by reference in its entirety.

BACKGROUND

A Domain Name System (DNS) server may be used to translate domain names to numerical Internet Protocol (IP) addresses so that devices and applications (e.g., web browsers) can access computing devices, services, and other resources using the Internet. Each computing device connected to the Internet may be assigned a unique IP address that is used by other computing devices to uniquely identify the computing device. The process of DNS name resolution involves converting a hostname (e.g., www.xyz.com) into an IP address (e.g., 205.245.172.72) or network address. DNS name resolution services are commonly provided by operating systems and network services. A DNS server may store a number of DNS records, with each DNS record including a domain name and an IP address of a service server. Each service server may have a unique IP address, and a plurality of service servers may share the same domain name.

BRIEF SUMMARY

Systems and methods are provided for improving the performance and robustness of computing systems that handle raw DNS queries or handle DNS queries that generate responsive DNS records from a DNS server that are not recognized or decodable by a DNS client. In some cases, a DNS client enables applications to send and receive DNS queries and responses to DNS queries that use DNS functionalities and customizations that are not recognized by the DNS client. This capability allows the applications to craft their own DNS queries to send and receive resulting response bytes or packets through the DNS client, while allowing the DNS queries to pass through the DNS client or a host system resolver to make use of host system cache, policies, and settings.

According to some embodiments, the technical benefits of the systems and methods disclosed herein include improved system robustness, reduced configuration overhead, reduced cost of computing and storage resources, improved network and data security, and improved system performance. Other technical benefits can also be realized through various implementations of the disclosed technologies.

This Summary is provided to introduce a brief description of some aspects of the disclosed technologies in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Like-numbered elements may refer to common components in the different figures.

DETAILED DESCRIPTION

Figure 1A:
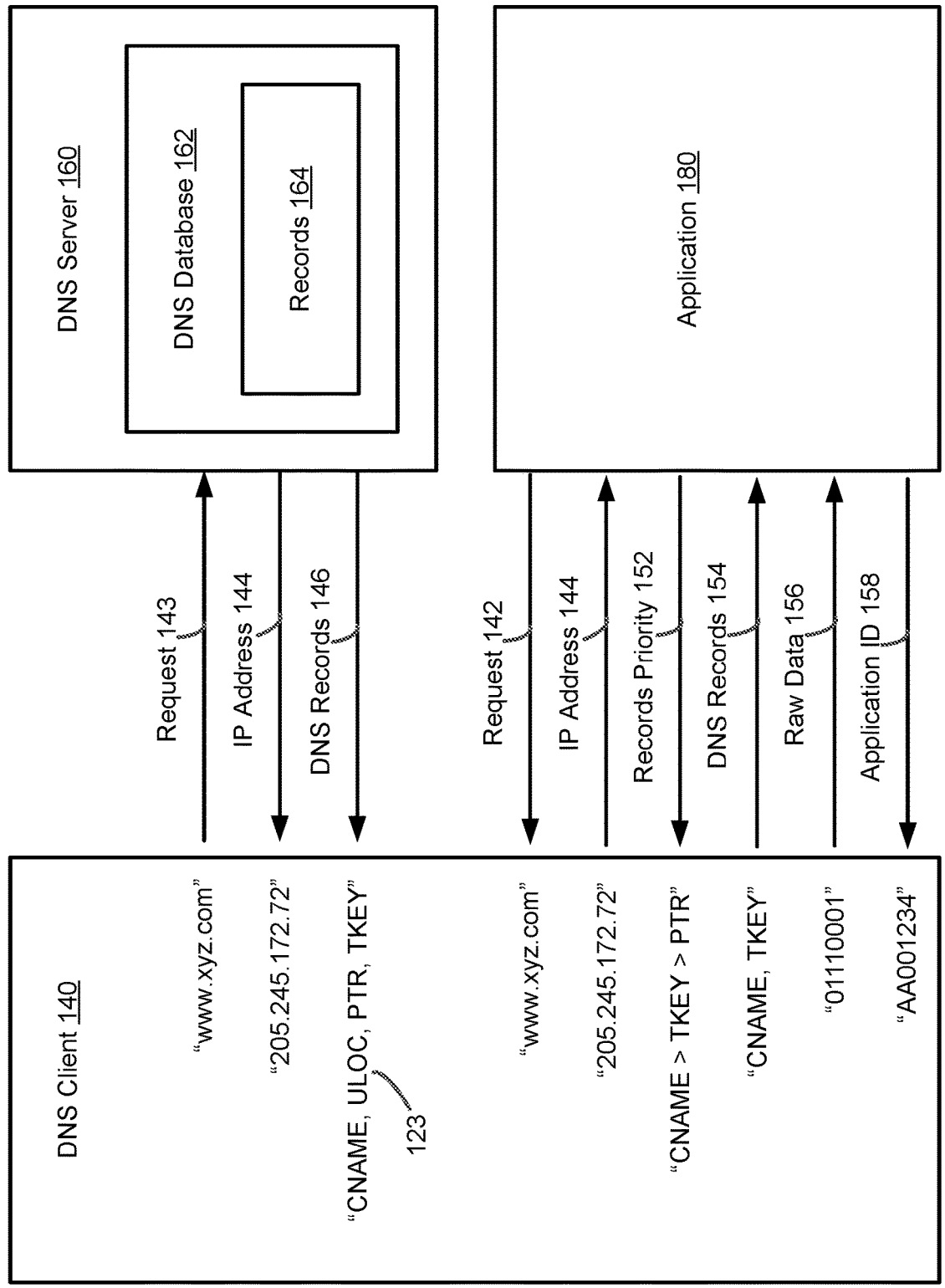
FIG. 1A depicts one embodiment of a DNS client in communication with a DNS server and an application.

In some cases, an application utilizes a DNS client to facilitate the conversion of a Uniform Resource Locator (URL) into a corresponding IP address. Before the application accesses webpages and other documents from sources over the Internet, the application first sends a URL for accessing the desired webpages and documents to the DNS client. In response, the DNS client returns to the application various DNS records associated with the URL, including an IP address for accessing a computing device or resource that stores the desired webpages and documents. The DNS client provides an Application Programming Interface (API) that is used by the application to send DNS packets associated with a DNS request that includes the URL and to receive DNS packets associated with a DNS response that includes the DNS records with the IP address. In some embodiments, the DNS client orders and selectively transmits DNS packets to the application based on DNS record priority information provided to the DNS client by the application.

The DNS is a distributed computing system that enables access to resources on the Internet by translating user-friendly domain names to IP addresses. The process of translating domain names to IP addresses is called name resolution. A DNS name resolution is often a first step in the majority of Internet transactions. The DNS is a client-server system that provides the name resolution service through a family of servers called Domain Name Servers.

The technologies described herein provide mechanisms for handling DNS queries that generate responsive DNS records from a DNS server that are not decodable by a DNS client. In some cases, the DNS client receives a DNS query from an application and provides a numerical IP address and one or more DNS records for a given domain name to the application. A DNS query may also be referred to as a DNS request. If the DNS client receives a packet of data corresponding to a DNS record that is unrecognized or is not decodable by the DNS client, then the packet of data comprises a raw packet. A raw packet may refer to a packet of data corresponding to a type of DNS record that is unrecognized or is not decodable by the DNS client. A raw DNS query comprises a DNS query that includes a raw packet.

In some cases, a packet of data corresponding to a DNS record is not decodable by the DNS client if the DNS client does not include a mapping for the packet of data to a known DNS record. In other cases, a packet of data corresponding to a DNS record is not decodable by the DNS client if the DNS client does not include a lookup table entry for the packet of data that maps to a known DNS record out of a list of known DNS records stored by the DNS client. A packet of data corresponding to a DNS record is unrecognized by the DNS client if the DNS client cannot identify the packet of data as corresponding to a known DNS record from a list of DNS records stored by the DNS client. In one example, a packet of data corresponding to a DNS record is unrecognized by the DNS client if the DNS client cannot match the DNS record with a known DNS record from a list of DNS records stored by the DNS client.

In one embodiment, it is detected that a DNS record is unrecognized by a DNS client if the DNS record is not decodable by the DNS client. In one embodiment, it is detected that a DNS record is not decodable by the DNS client if a mapping for the DNS record does not exist within the DNS client or if the DNS client cannot acquire a mapping for the DNS record to known DNS record from a lookup table stored within the DNS client. In another embodiment, it is detected that a DNS record is not decodable by the DNS client if software running on the DNS client does not identify the DNS record as a known DNS record from a list of DNS records stored by the DNS client.

The technical benefits of implementing a DNS client (e.g., running on an operating system) with the ability to handle raw DNS queries include reduced compute and memory resource requirements and reduced network congestion as the need to perform frequent updates to the DNS client with the latest DNS functionalities and customizations to maintain system security can be eliminated. A reduction in the number of updates to the DNS client reduces the number of processor and memory resources required to implement the DNS client and reduces networking overhead and network congestion. In some cases, a DNS client provides an interface (e.g., an API) that enables caller applications (e.g., applications that request or call the DNS client to perform DNS name resolution services) to send and receive DNS queries and responses to DNS queries that use DNS functionalities and customizations that are not recognized by the DNS client. This capability allows the caller applications to write their own DNS queries to send and receive resulting response bytes or packets through the DNS client (e.g., to receive raw bytes or raw packets associated with a DNS record that is not recognized by the DNS client), while allowing the DNS queries to pass through the DNS client or a host system resolver to make use of host system cache, policies, and settings. The host system policies include security policies, redirection policies and other policies. The host system policies are applied to improve system security by protecting against malware and phishing attacks and to improve system performance by caching frequently used IP addresses.

In some embodiments, a DNS client running on a host system provides an API that enables caller applications to make DNS queries that accept either a raw packet containing a DNS query, or a query name and type, and to augment it with settings and configurations from the host system (e.g., a computing system or a host operating system). In some cases, a raw packet is passed through the DNS client in its entirety to a caller application or the raw packet is truncated by the DNS client based on DNS record priority information received by the DNS client from the caller application. In some cases, the caller application comprises an application that calls the DNS client, such as the application 180 in FIG. 1A that utilizes the DNS client 140 to acquire DNS records. In one example, the DNS query includes a 12-byte DNS header followed by a question section for the DNS query, or by one or more DNS records for the response. In one example, if Transmission Control Protocol (TCP) is used, then the raw packet is prefixed with a two-byte length field. In some cases, the DNS client applies host Name Resolution Policy Table (NRPT) rules and performs encrypted DNS queries.

In some embodiments, an application requires DNS name resolution with a DNS client (e.g., running on a host operating system) to get a DNS query answered. The DNS client acquires a response to the DNS query from a DNS server, applies one or more system policies (e.g., security policies for the host operating system) and then returns parsed answers to the requesting application. As examples, the parsed answers include an IP address, one or more DNS records, and one or more raw packets. In one embodiment, the responsive answers transmitted to the application include raw packets that have been truncated and/or one or more DNS records that have been truncated based on a threshold data size for the DNS records. The DNS server stores DNS records for a domain and responds with answers to DNS queries against its DNS database. Some examples of types of DNS records stored in the DNS database include IP addresses (e.g., a 32-bit IPv4 address or a 128-bit IPv6 address), SMTP mail exchangers (MX), name servers (NS), location information (LOC), pointers for reverse DNS lookups (PTR), transaction key (TKEY), and domain name aliases (CNAME). A CNAME refers to the canonical name for an alias. Over time, additional types of DNS records or resource record types may be added to increase DNS functionality.

One technical issue with relying on a DNS client to facilitate DNS name resolutions is that the DNS client can operate in an environment in which updates to the latest DNS functionalities and customizations are not feasible or are not performed with sufficient frequency, which leads to the DNS client to be unable to decode or recognize newly created DNS records. If the DNS client does not have the capability to pass through unrecognized DNS records to applications, then applications that have the ability to utilize newly created DNS records would not be able to take advantage of the functionalities offered by the newly created DNS records. Therefore, applications that are capable of handling newly created DNS records would be prevented from using the latest DNS functionalities and customizations due to the limitations of the DNS client, and would be limited to the record types that the DNS client can parse. Technical benefits of utilizing a DNS client with the ability to detect that a first DNS record of a first set of DNS records is unrecognized by a DNS client and generating a second set of DNS records different from the first set of DNS records that includes the first DNS record using priority information for the second set of DNS records includes a reduction in the number of updates required by the DNS client and a reduction in the number of processor and memory resources required to implement the DNS client. Technical benefits of implementing a DNS client with the ability to handle DNS records that the DNS client is unable to decode or recognize include reduced energy consumption and reduced networking congestion as the need to perform frequent updates to the DNS client with the latest DNS functionalities and customizations while abiding by system security policies to prevent compromising system security would be reduced. Fewer updates to the DNS client may reduce the power and energy consumption of compute and memory resources used by the DNS client. Technical benefits of generating a second set of DNS records that is a subset of a first set of DNS records acquired from a DNS server using priority information for the second set of DNS records include a reduction in the number of updates required by a DNS client and a reduction in the number of processor and memory resources required to implement the DNS client.

In some embodiments, a DNS client running on a host system is configured to handle raw DNS queries via an API that enables caller applications to send and receive DNS queries that include raw packets or that are already in the form of the bytes on the network. In some cases, the API allows a caller application to pass through its own DNS packets to send and receive the resulting response bytes from a DNS server and to continue to enforce and utilize host system cache, policies, and settings. In one example, an application for running a first operating system environment is running on a host system that also runs a DNS client for facilitating DNS name resolution. The DNS client allows the application to make DNS queries that pass through the host system and makes use of the host system policies without requiring any special configuration to the application.

FIG. 1A depicts one embodiment of a DNS client 140 in communication with a DNS server 160 and application 180. The DNS server 160 includes a DNS database 162 that stores DNS records 164. The application 180 sends a DNS request 142 to the DNS client 140 along with priority information for the DNS records to be supplied by the DNS client 140. The priority information for the DNS records is transmitted as records priority 152 and comprises a ranking of types of DNS records from the highest priority DNS records to the lower priority DNS record. The application 180 also sends an application identifier (ID) 158 that uniquely identifies the application 180 to the DNS client 140. In response to the DNS request being transmitted to the DNS client 140, the DNS client 140 provides an IP address 144, a set of DNS records 154, and raw data 156 to the application 180. The raw data 156 comprises a raw packet, which comprises a packet of data that includes data corresponding to a type of DNS record that is not recognized or decodable by the DNS client 140. The DNS client 140 acquires the IP address 144 and one or more DNS records 146 from the DNS server 160 in response to transmitting the DNS request 143 to the DNS server 160. Both the IP address 144 and the one or more DNS records 146 are transmitted to the DNS client 140 from the DNS server 160 in a single DNS message. Some examples of the types of DNS records in the DNS message include A records (e.g., 32-bit IPv4 addresses), AAAA records (e.g., 128-bit Ipv6 addresses), CNAME records, TXT records, and TKEY records. In some cases, the one or more DNS records 146 and the IP address 144 are stored by the DNS server 160 within the DNS database 162. The one or more DNS records 146 comprise a subset of the DNS records 164 that is less than all of the DNS records 164.

Figure 1B:
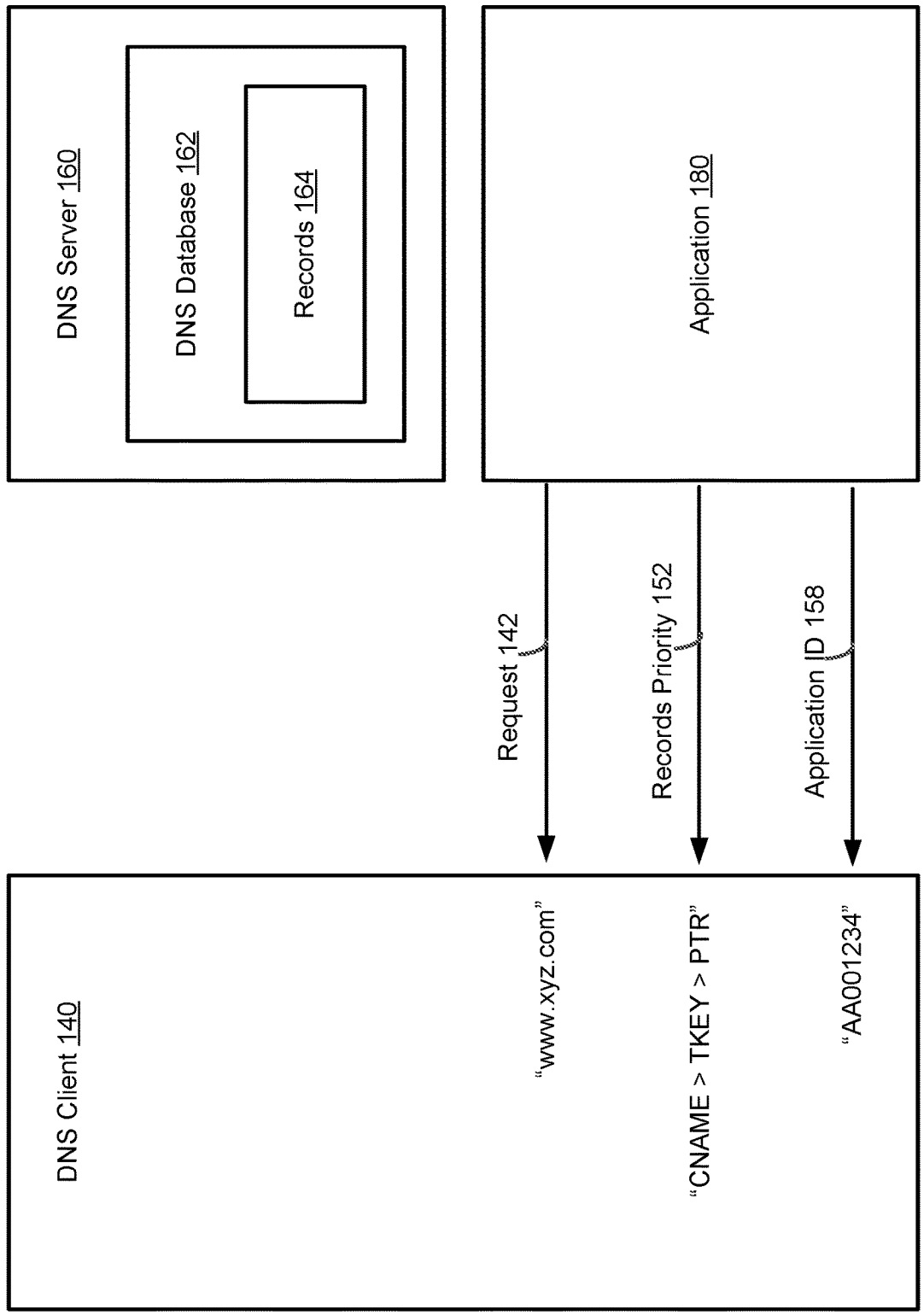
FIG. 1B depicts one embodiment of the DNS client, the DNS server, and the application in FIG. 1A when a DNS request is made by the application.

FIG. 1B depicts one embodiment of the DNS client 140, the DNS server 160, and the application 180 in FIG. 1A when a DNS request is made by the application 180. The DNS client 140 is configured to receive DNS requests from the application 180 and to facilitate DNS name resolution operations. The application 180 comprises a caller application that sends a request for an IP address given a particular domain name. In some cases, the application 180 comprises a computing application, such as a web browser or emulation program, that is running on a host computing system, such as a computing device or a virtual machine. In some cases, the DNS client 140 runs on the same host computing system as the application 180 or is executed on a different computing system.

As depicted in FIG. 1B, the application 180 has provided a DNS request 142 to the DNS client 140 that includes a hostname (e.g., www.xyz.com). The DNS request 142 is provided to the DNS client 140 by electronically transmitting the DNS request to the DNS client 140 over a networking connection. A DNS request may include an identification of a domain name, for example, that is identified using a Uniform Resource Locator (URL) for a web page. The application 180 has also provided records priority 152 that comprises ranking or priority information for DNS records to be retrieved from the DNS client 140. In some cases, priority information may correspond with numerical values associated with priority levels for a set of DNS records. Ranking information may correspond to a ranked ordering for a set of DNS records. The records priority 152 includes a ranking of types of DNS records in which a CNAME is given higher priority than a TKEY record, and a TKEY record is given higher priority than a PTR record. The application 180 has also provided an application identifier (ID) 158 that uniquely identifies the application 180. The application ID 158 is used by the DNS client 140 to determine a set of DNS records to be transmitted to the application 180 as an answer to the DNS request 142.

Figure 1C:
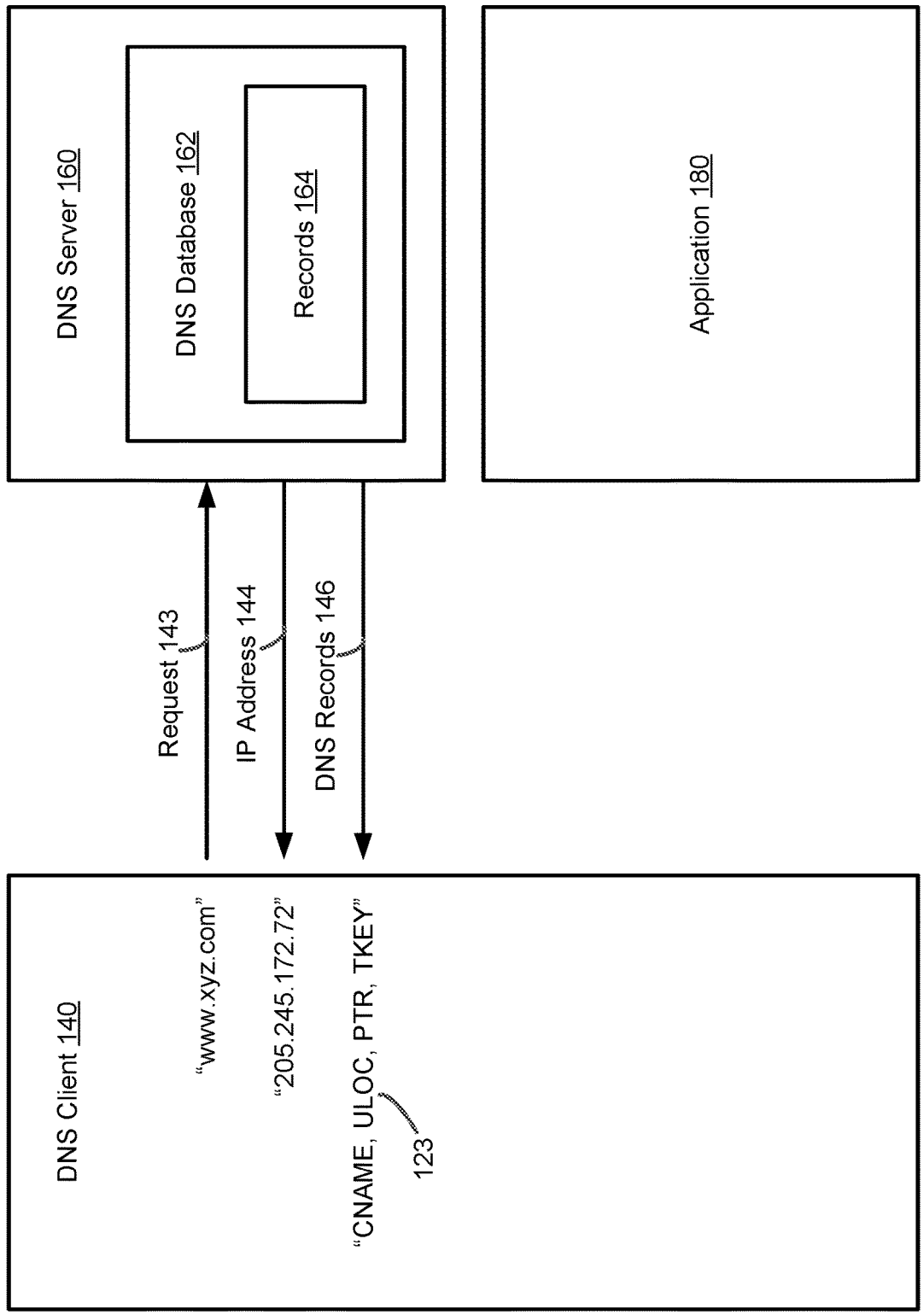
FIG. 1C depicts one embodiment of the DNS client in communication with the DNS server and application of FIG. 1A when the DNS client is requesting information from a DNS database.

FIG. 1C depicts one embodiment of the DNS client 140 in communication with the DNS server 160 and application 180 of FIG. 1A when the DNS client 140 is requesting information from the DNS database 162. In response to receiving the DNS request 142 and the records priority 152 from the application 180, the DNS client 140 transmits a DNS request 143 to the DNS server 160 and receives an IP address 144 and one or more DNS records 146. The DNS request 143 comprises a repackaged version of the DNS request 142. In some cases, the IP address 144 comprises an A record or an AAAA record (e.g., an IPv6 address for a domain). In some cases, the DNS server 160 transmits both the IP address 144 and the one or more DNS records 146 to the DNS client 140 within a single DNS message.

As depicted in FIG. 1C, the DNS server 160 has provided to the DNS client 140 an IP address 144 of "205.245.172.72" and DNS records 146 including DNS records corresponding to CNAME, PTR, and TKEY. Additionally, the DNS records 146 include a new DNS record or an unknown DNS record to the DNS client 140 corresponding with ULOC 123. In some cases, the ULOC 123 record is associated with location information for a domain name.

Figure 1D:
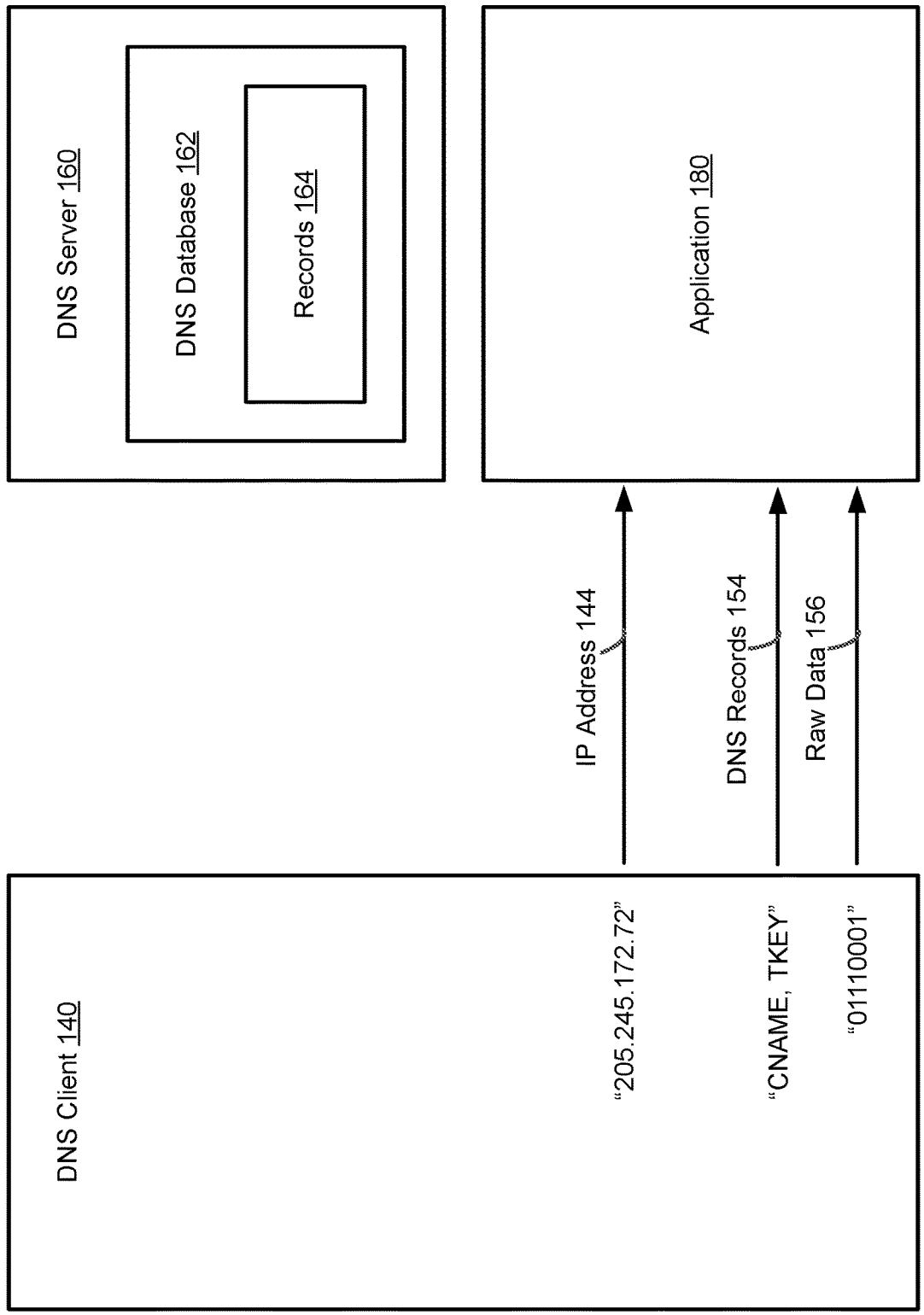
FIG. 1D depicts one embodiment of the DNS client in communication with the DNS server and application of FIG. 1A when the DNS client is transmitting information to the application.

FIG. 1D depicts one embodiment of the DNS client 140 in communication with the DNS server 160 and application 180 of FIG. 1A when the DNS client 140 is transmitting information to the application 180. In response to the DNS client 140 receiving the IP address 144 and the DNS records 146 from the DNS server 160, the DNS client 140 transmits the IP address 144, the one or more DNS records 154, and raw data 156 to the application 180. The DNS client 140 selects a subset of the DNS records 146 received from the DNS server 160 to output as DNS records 154. In one example, the DNS records 146 corresponds with a first number of records (e.g., four) and the DNS records 154 corresponds with a second number of records (e.g., two) less than the first number of records. In some embodiments, the DNS client 140 identifies a subset of the DNS records from the DNS records 146 using a priority ranking of type of DNS records from the records priority 152. In some embodiments, the DNS client 140 identifies or selects a subset of the DNS records from the DNS records 146 based on the DNS records 146 received from the DNS server 160 and a threshold data size for the DNS records (e.g., the amount of data for the DNS records 154 may be limited to at most 512 bytes of data). In one example, the DNS client 140 filters the DNS records 146 to select a maximum number of DNS records from the DNS records 146 that satisfies the threshold data size for the DNS records. In some cases, the threshold data size for the DNS records is set based on a time of day for the data transmission to the application 180. In some cases, the application 180 also specifies a threshold data size for the DNS records that can be transmitted to the application 180. In one example, the threshold data size for the DNS records comprises 512B and the DNS client 140 selects a subset of the DNS records 146 such that the DNS records transmitted to the application 180 do not exceed the threshold data size for the DNS records.

As depicted in FIG. 1D, the DNS client 140 has provided (e.g., via electronic transmission) to the application 180 the IP address 144 of "205.245.172.72," the DNS records 154 including DNS records corresponding to CNAME and TKEY, and raw data 156 that includes "01110001" which represents a wire representation of a portion of a DNS response for the DNS request 142. The wire representation comprises a binary representation for the raw data 156. The raw data 156 that the DNS client 140 has transmitted to the application 180 comprises the wire representation of a portion of the DNS response to the DNS request 143 in FIG. 1C.

Figure 1E:
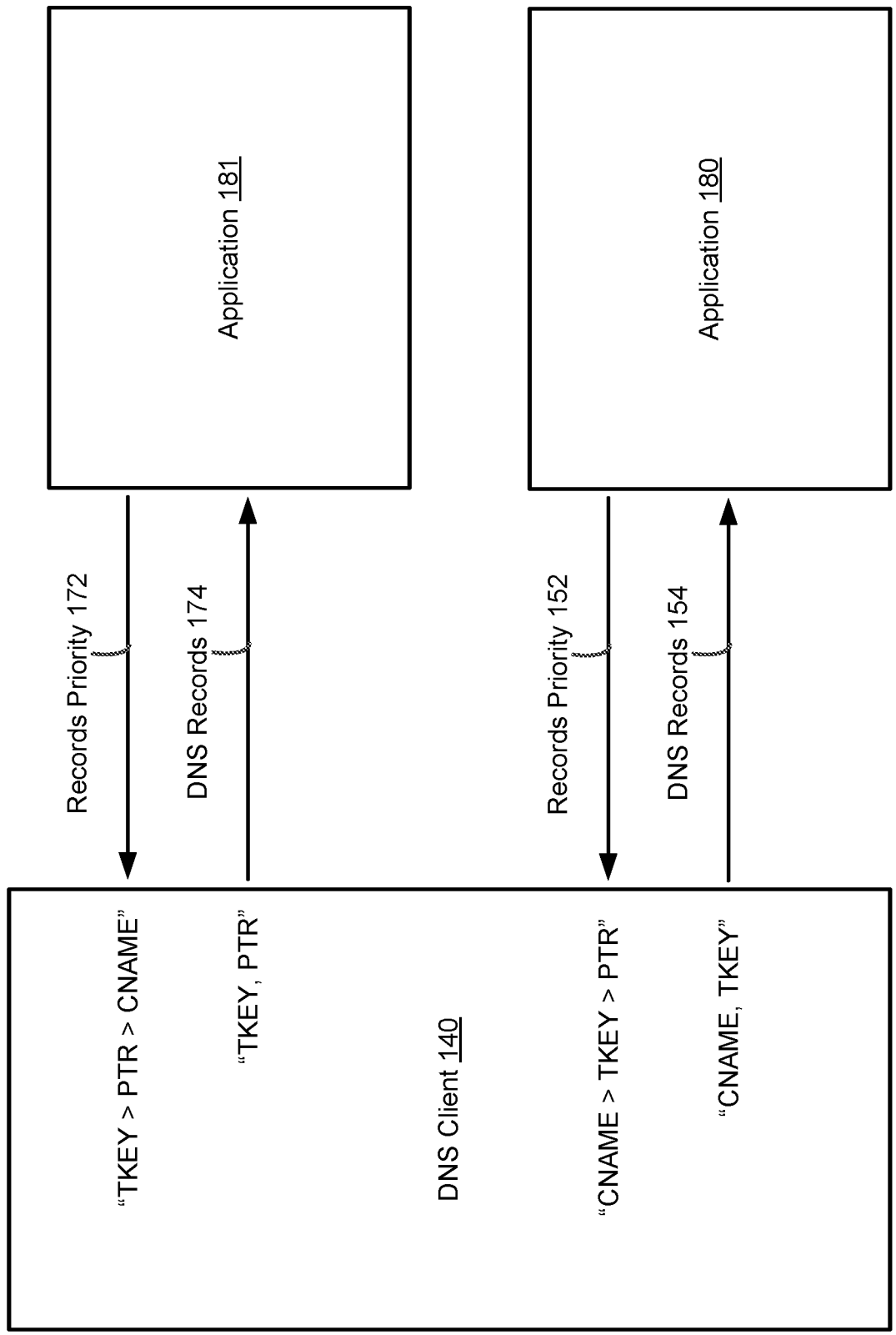
FIG. 1E depicts one embodiment of the DNS client in communication with the application and a second application.

FIG. 1E depicts one embodiment of the DNS client 140 in communication with the application 180 and a second application 181. The second application 181 has provided a records priority 172 that includes a ranking of types of DNS records in which a TKEY is given higher priority than a PTR record, and a PTR record is given higher priority than a CNAME record. The different priority ranking of records priority 172 compared with records priority 152 has caused the DNS client 140 to transmit a different set of DNS records as the DNS records 174 include TKEY and PTR records, while the DNS records 154 include CNAME and TKEY records.

Figure 2A:
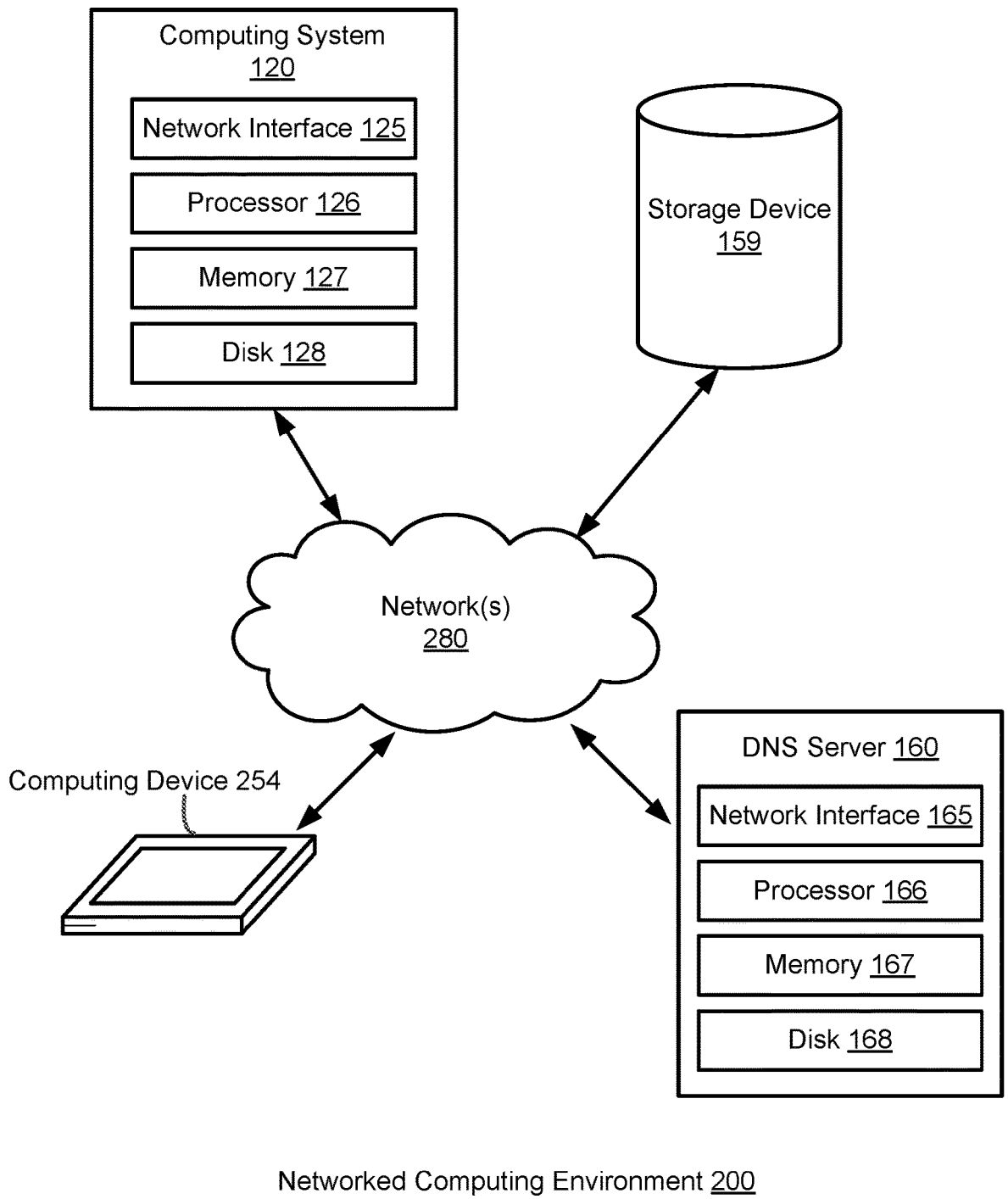
FIG. 2A depicts one embodiment of a networked computing environment in which the disclosed technology may be practiced.

FIG. 2A depicts one embodiment of a networked computing environment 200 in which the disclosed technology may be practiced. The networked computing environment 200 includes a computing system 120, storage device 159, DNS server 160, and a computing device 254 in communication with each other via one or more networks 280. The networked computing environment 200 includes various computing and storage devices interconnected through one or more networks 280. In some cases, the networked computing environment 200 corresponds with or provides access to a cloud computing environment providing Software-as-a-Service (SaaS) or Infrastructure-as-a-Service (IaaS) services. The one or more networks 280 allows computing devices and/or storage devices to connect to and communicate with other computing devices and/or other storage devices. In some cases, the networked computing environment 200 includes other computing devices and/or other storage devices not shown. The other computing devices may include, for example, a mobile computing device, a non-mobile computing device, a server, a workstation, a laptop computer, a tablet computer, a desktop computer, or an information processing system. The other storage devices may include, for example, a storage area network storage device, a networked-attached storage device, a hard disk drive, a solid-state drive, a data storage system, or a cloud-based data storage system. In some cases, the one or more networks 280 include a cellular network, a mobile network, a wireless network, a wired network, a secure network such as an enterprise private network, an unsecure network such as a wireless open network, a local area network (LAN), a wide area network (WAN), the Internet, or a combination of networks.

In some embodiments, the computing devices within the networked computing environment 200 comprises real hardware computing devices or virtual computing devices, such as one or more virtual machines. The storage devices within the networked computing environment 200 may comprise real hardware storage devices or virtual storage devices, such as one or more virtual disks. In some cases, the real hardware storage devices include non-volatile and volatile storage devices.

In some cases, the computing system 120 comprises a distributed computing system or a system for handling DNS name resolutions. As depicted in FIG. 2A, the computing system 120 includes a network interface 125, processor 126, memory 127, and disk 128 all in communication with each other. The network interface 125, processor 126, memory 127, and disk 128 comprise real components or virtualized components. In one example, the network interface 125, processor 126, memory 127, and disk 128 are provided by a virtualized infrastructure or a cloud-based infrastructure. Network interface 125 allows the computing system 120 to connect to one or more networks 280. As examples, network interface 125 includes a wireless network interface and/or a wired network interface. Processor 126 allows the computing system 120 to execute computer readable instructions stored in memory 127 in order to perform processes described herein. Processor 126 includes one or more processing units, such as one or more CPUs, one or more GPUs, and/or one or more NPUs. Memory 127 comprises one or more types of memory (e.g., RAM, SRAM, DRAM, EEPROM, Flash). Disk 128 includes a hard disk drive and/or a solid-state drive. In some cases, memory 127 and disk 128 comprise hardware storage devices.

In some embodiments, the computing device 254 comprises a mobile computing device, such as a tablet computer, that allows a user to access a graphical user interface for the computing system 120. A user interface is provided by the computing system 120 and displayed using a display screen of the computing device 254.

In some cases, a server, such as DNS server 160, allows a client device, such as the computing system 120 or computing device 254, to download information or files (e.g., executable, text, application, audio, image, or video files) from the server. In some cases, the DNS server 160 comprises a hardware server. In some cases, the server acts as an application server or a file server.

The DNS server 160 includes a network interface 165, processor 166, memory 167, and disk 168 all in communication with each other. Network interface 165 allows server 160 to connect to one or more networks 280. In some cases, network interface 165 includes a wireless network interface and/or a wired network interface. Processor 166 allows server 160 to execute computer readable instructions stored in memory 167 in order to perform processes described herein. Processor 166 includes one or more processing units, such as one or more CPUs, one or more GPUs, and/or one or more NPUs. Memory 167 comprises one or more types of memory (e.g., RAM, SRAM, DRAM, EEPROM, Flash). Disk 168 includes a hard disk drive and/or a solid-state drive. In some cases, the disk 168 includes a flash-based SSD or a hybrid HDD/SSD drive. In some cases, memory 167 and disk 168 comprise hardware storage devices.

In some cases, the networked computing environment 200 provides a cloud computing environment for one or more computing devices. In one embodiment, the networked computing environment 200 includes a virtualized infrastructure that provides software, data processing, and/or data storage services to end users accessing the services via the networked computing environment. In one example, networked computing environment 200 provides cloud-based applications to computing devices, such as computing device 254, using the computing system 120.

Figure 2B:
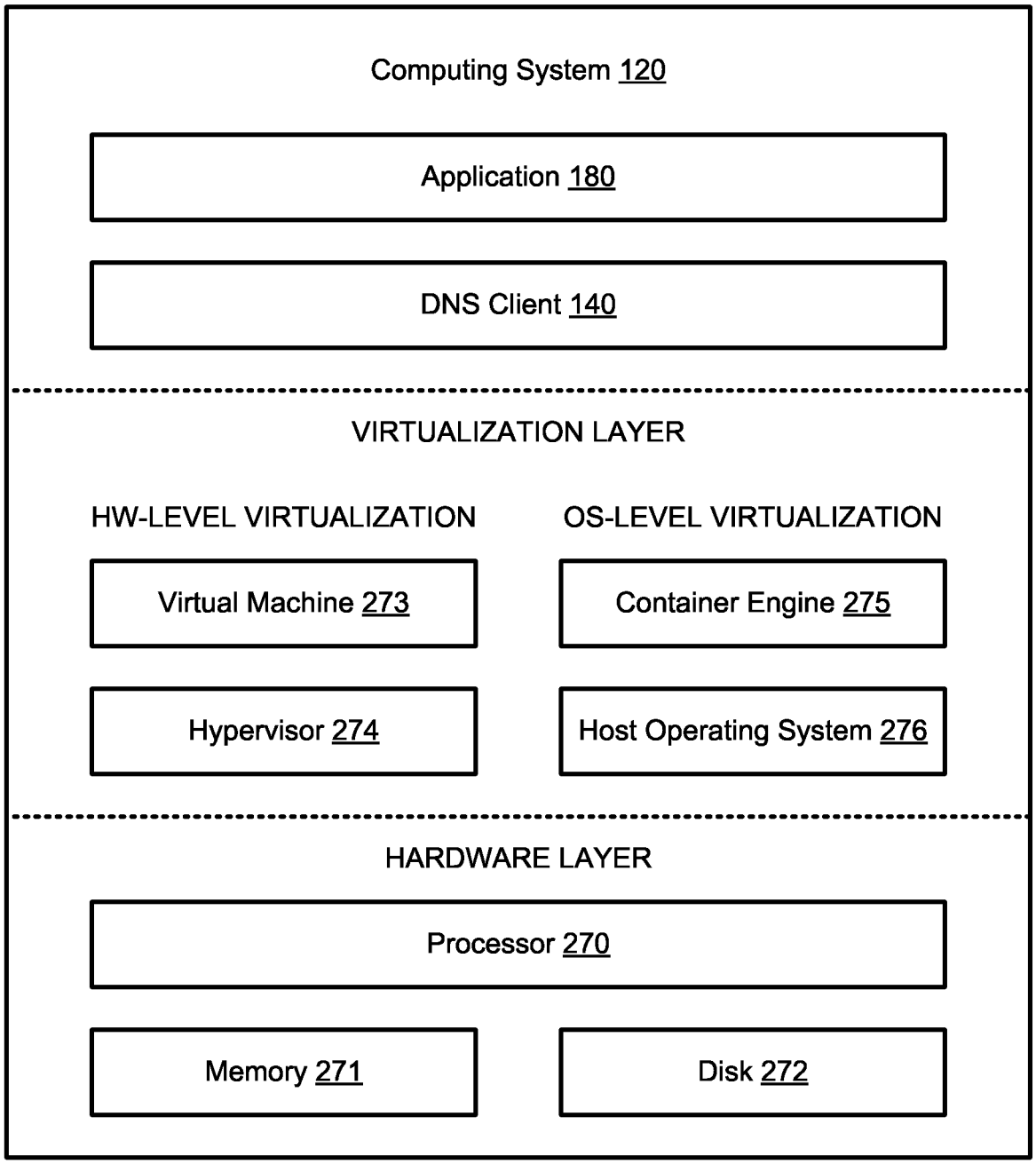
FIG. 2B depicts one embodiment of various components of a computing system.

FIG. 2B depicts one embodiment of various components of the computing system 120. As depicted, the computing system 120 includes hardware-level components and software-level components. The hardware-level components include one or more processors 270, one or more memories 271, and one or more disks 272. Both the one or more memories 271 and the one or more disks 272 comprise storage devices. The software-level components include software applications and computer programs. In some embodiments, the DNS client 140 and application 180 are implemented using software or a combination of hardware and software. The one or more processors 270 comprise a processing system or a portion thereof. The computing system 120 comprises a processing system, such as a processing system for handling DNS queries.

In some cases, the software-level components are run using a dedicated hardware server. In other cases, the software-level components are run using a virtual machine or containerized environment running on a plurality of machines. In various embodiments, the software-level components run from the cloud (e.g., the software-level components are deployed using a cloud-based compute and storage infrastructure).

As depicted in FIG. 2B, the software-level components may also include virtualization layer processes, such as virtual machine 273, hypervisor 274, container engine 275, and host operating system 276. The hypervisor 274 comprises a native hypervisor or a hosted hypervisor. The hypervisor 274 provides a virtual operating platform for running one or more virtual machines, such as virtual machine 273. A hypervisor may comprise software that creates and runs virtual machine instances. Virtual machine 273 includes a plurality of virtual hardware devices, such as a virtual processor, a virtual memory, and a virtual disk. The virtual machine 273 includes a guest operating system that has the capability to run one or more software applications. The virtual machine 273 runs the host operation system 276 upon which the container engine 275 is run.

A container engine 275 runs on top of the host operating system 276 in order to run multiple isolated instances (or containers) on the same operating system kernel of the host operating system 276. Containers facilitate virtualization at the operating system level and provide a virtualized environment for running applications and their dependencies. Containerized applications comprise applications that run within an isolated runtime environment. The container engine 275 may acquire a container image and convert the container image into running processes. In some cases, the container engine 275 groups containers that make up an application into logical units.

In some embodiments, the depicted components of the computing system 120 that includes the DNS client 140 are implemented in the cloud or in a virtualized environment that allows virtual hardware to be created and decoupled from the underlying physical hardware. In some cases, the DNS client 140 acquires a first set of DNS records from a DNS server and generates a subset of the first set of DNS records based on priority information. In some embodiments, a second set of DNS records is generated from a first set of DNS records using a machine learning model. In one example, the first set of DNS records and priority information for the second set of DNS records is input to the machine learning model to generate the second set of DNS records from the first set of DNS records.

The computing system 120 may store and utilize one or more machine learning models that are stored in a memory, such as memory 271. The one or more machine learning models may be trained, executed, and/or deployed using one or more processors, such as processor 270. The one or more machine learning models may include neural networks (e.g., deep neural networks), support vector machine models, decision tree-based models, k-nearest neighbor models, Bayesian networks, or other types of models such as linear models and/or non-linear models. A linear model may be specified as a linear combination of input features. A neural network may comprise a feed-forward neural network, recurrent neural network, or a convolutional neural network. The one or more machine learning models may include one or more generative AI models. The one or more machine learning models may include one or more multimodal models. The one or more machine learning models may include one or more language models, such as security specific LLMs.

A large language model (LLM) may refer to a language model that comprises a neural network with a large number of parameters (e.g., millions or billions of parameters or weights). In order to reduce training time and cost, transfer learning may be utilized in which a pre-trained model is used as a starting point for a specific task and then trained or fine-tuned with a supervised dataset for the specific task. In one example, an LLM may be pre-trained using a large dataset and then fine-tuned using a much smaller dataset to tailor the LLM to solve a specific task. Pretraining may refer to the act of training a machine learning model from scratch without any prior knowledge using a large corpus of data. Fine-tuning may refer to a transfer learning process that modifies a pretrained LLM by training the LLM in a supervised or semi-supervised manner. In some cases, the fine-tuning involves adapting a pretrained LLM for a specific task by fine-tuning the LLM using a task specific dataset.

An LLM may comprise a transformer model that is implemented using a transformer-based neural network architecture. A transformer model may include an encoder and/or a decoder. An encoder may extract features from an input sequence and a decoder may use the extracted features from the encoder to produce an output sequence. In some cases, an encoder comprises one or more encoding layers and a decoder may comprise one or more decoding layers. Each encoding and decoding layer may include a self-attention mechanism that relates tokens within a sequence of tokens to other tokens within the sequence. In one example, the self-attention mechanism may allow the transformer model to examine a word within a sentence and determine the relative importance of other words within the same sentence to the examined word. In some cases, an encoder includes a self-attention layer and a feed forward neural network layer and a decoder may include two self-attention layers and a feed forward neural network layer. A transformer model may utilize an encoder-decoder architecture, an encoder only architecture, or a decoder only architecture.

One example of a transformer model is a Generative Pre-trained Transformer (GPT) model. A GPT model may comprise a type of LLM that uses deep learning to generate human-like text. A GPT model may be referred to as being "generative" because it can generate new content based on a given input prompt (e.g., a text prompt), "pre-trained" because it is trained on a large corpus of data before being fine-tuned for specific tasks, and a "transformer" because it utilizes a transformer-based neural network architecture to process the input prompt to generate the output content. Generative AI may be used to generate new content, such as text, images, audio, and video content.

In some embodiments, a machine learning model is trained to generate a language text response given an inputted text prompt. The inputted text prompt may provide information to help guide the machine learning model to generate an appropriate text response. Prompt engineering may be used to alter or update the inputted text prompt such that the machine learning model generates a more relevant text response. In some cases, the text response is generated by predicting the next set of words in a sequence of words provided by the inputted text prompt using a transformer model, such as a GPT language model. The transformer model may be trained using sets of input prompt-response pairs.

Multimodal learning may refer to a type of machine learning in which a machine learning model is trained to understand multiple forms of input data (e.g., text, images, video, and audio data) that derive from different modalities. Image data may include different types of images, such as color images, depth images, and thermal images. In some cases, a machine learning model comprises a multimodal model, a language model, or a visual model.

Figure 3A:
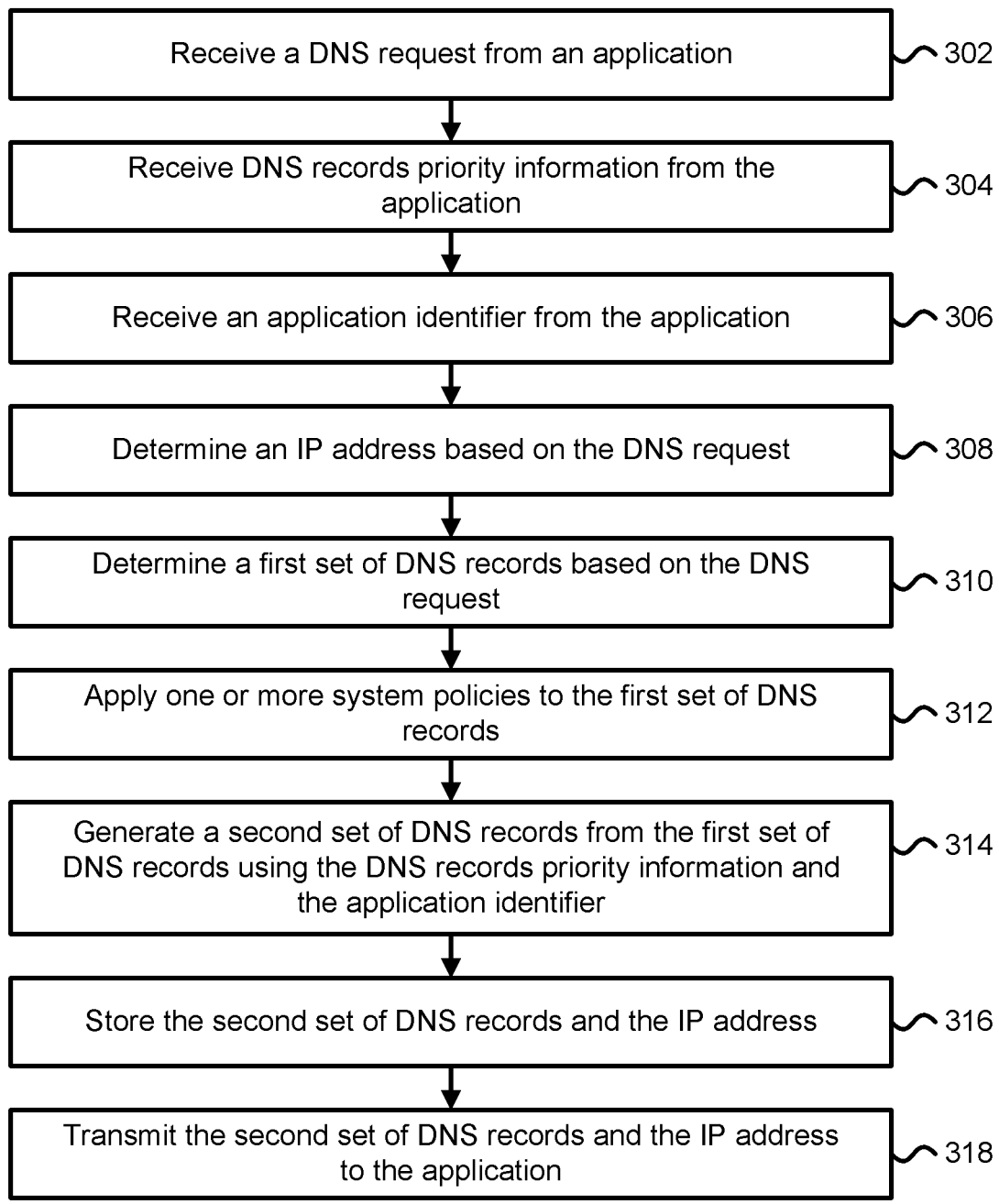
FIG. 3A depicts a flowchart describing one embodiment of a process for handling raw DNS queries that generate responsive DNS records from a DNS server that are not recognized or decodable by a DNS client.

FIG. 3A depicts a flowchart describing one embodiment of a process for handling raw DNS queries that generate responsive DNS records from a DNS server that are unrecognized or not decodable by a DNS client. In one embodiment, the process of FIG. 3A is performed by a computing system, such as the computing system 120 in FIG. 2B. In another embodiment, the process of FIG. 3A is implemented using a cloud-based computing platform or cloud-based computing services.

In step 302, a DNS request from an application is received. In one example, the application comprises a computing application that is running on a computing system, such as the computing system 120 in FIG. 2A. In some cases, the DNS request corresponds with the DNS request 142 in FIG. 1A and the DNS request is received at a DNS client, such as the DNS client 140 in FIG. 1A. In step 304, DNS records priority information is received or acquired from the application. In some cases, the DNS records priority information, which may correspond with the records priority 152 in FIG. 1A, comprises a ranking of types of DNS records from the highest priority DNS records to the lower priority DNS record. In step 306, an application identifier is received from the application. The application identifier uniquely identifies the application and in some embodiments corresponds with the application ID 158 in FIG. 1B.

In step 308, an IP address is determined based on the DNS request received in step 302. In step 310, a first set of DNS records are determined based on the DNS request. The IP address and the first set of DNS records could be determined via acquisition of the IP address and the first set of DNS records from a DNS server, such as the DNS server 160 in FIG. 1A. In step 312, one or more system policies are applied to the first set of DNS records. In one example, the one or more system policies include security policies and redirection policies. The one or more system policies are applied to improve system security by protecting against malware and phishing attacks and to improve system performance by caching frequently used IP addresses. In some cases, a DNS client applies the one or more system policies to the response records from the DNS server and/or applies the one or more system policies to DNS requests before they are transmitted to the DNS server.

In step 314, a second set of DNS records from the first set of DNS records is generated using the DNS records priority information and the application identifier. In one embodiment, the second set of DNS records comprises a subset of the first set of DNS records that have been selected as a top threshold number of DNS records (e.g., as the top ten DNS records) based on a ranking of priorities for the second set of DNS records. In one example, the subset of the first set of DNS records comprises a number of DNS records that is less than all of the DNS records of the first set of DNS records. In some cases, the application identifier is used to determine or set the top threshold number of DNS records. For example, a first application identifier maps to a first threshold number of DNS records and a second application identifier maps to a second threshold number of DNS records greater than the first threshold number of DNS records. In some cases, a DNS client filters the first set of DNS records to generate the second set of DNS records such that the second set of DNS records does not exceed a threshold number of DNS records.

In some embodiments, a DNS client detects that a first DNS record of the first set of DNS records comprises a DNS record that is unrecognized or is not decodable by the DNS client, and in response the DNS client identifies a raw packet associated with the first DNS record. In some embodiments, the determination of whether the raw packet or the first DNS record is transmitted to the application depends on the application identifier. In one example, if the application identifier corresponds with an application that can handle raw packets, then the raw packet is transmitted to the application as part of a response to the DNS request. However, if the application identifier corresponds with an application that cannot decode or utilize the raw packet, then the DNS client does not transmit the first DNS record to the application and instead transmits a different lower ranking DNS record in the place of the first DNS record. In some embodiments, the DNS client detects two or more DNS records of the first set of DNS records that are not decodable by the DNS client, and in response the DNS client identifies two or more raw packets corresponding with the two or more DNS records and transmit the two or more raw packets to the application.

In step 316, the second set of DNS records and the IP address are stored. In one example, the second set of DNS records and the IP address are stored using a storage layer or device, such as the disk 272 in FIG. 2B. In step 318, the second set of DNS records and the IP address are transmitted to the application. In examples, the second set of DNS records and the IP address are transmitted via an electronic transmission over a network connection to the application.

Figure 3B:
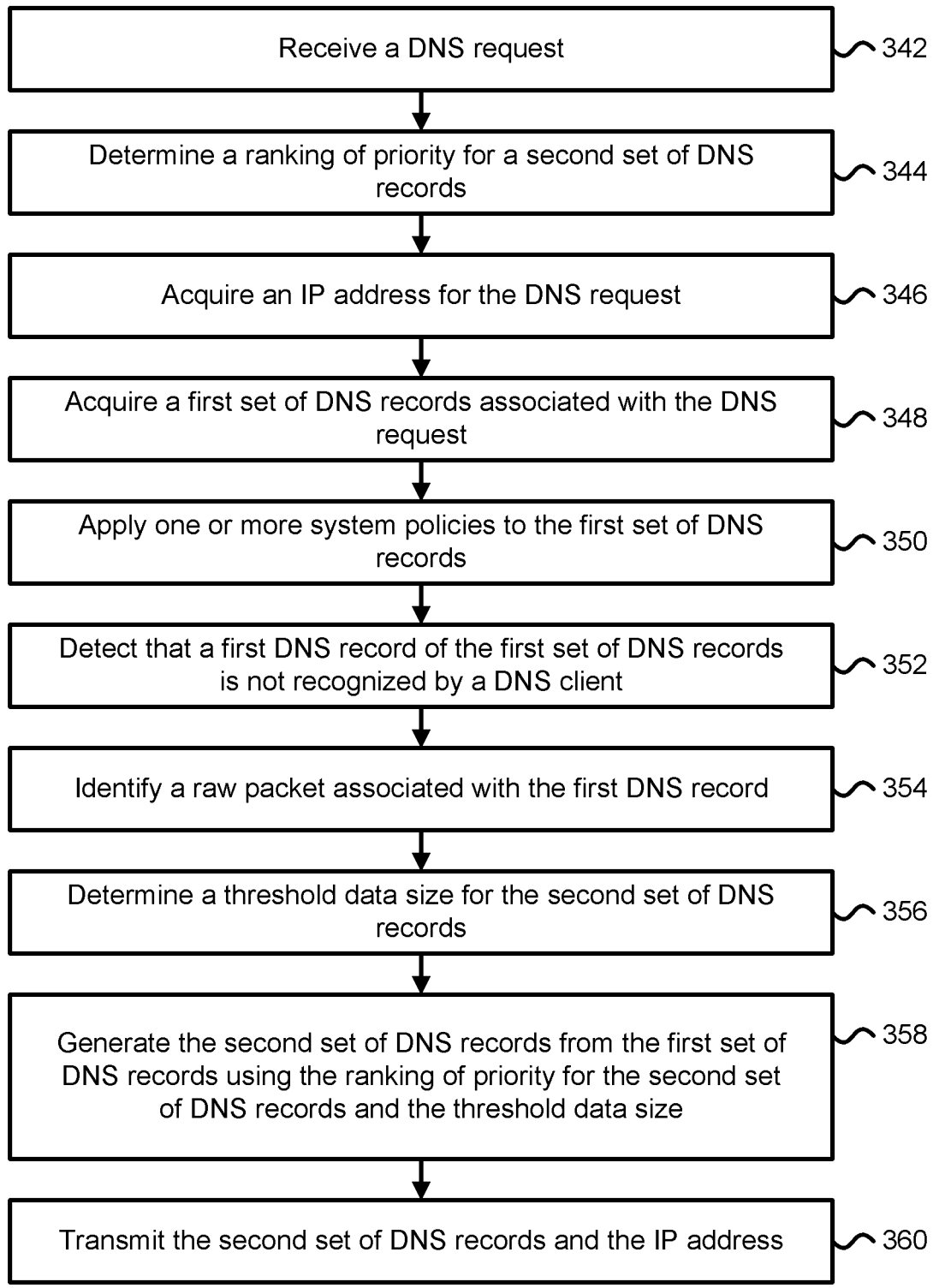
FIG. 3B depicts a flowchart describing another embodiment of a process for handling raw DNS queries that generate responsive DNS records from a DNS server that are not recognized or decodable by a DNS client.

FIG. 3B depicts a flowchart describing another embodiment of a process for handling raw DNS queries that generate responsive DNS records from a DNS server that are unrecognized or not decodable by a DNS client. In one embodiment, the process of FIG. 3B is performed by a computing system, such as the computing system 120 in FIG. 2B. In another embodiment, the process of FIG. 3B is implemented using a cloud-based computing platform or cloud-based computing services.

In step 342, a DNS request is received. In some cases, the DNS request is received at a DNS client and the DNS request corresponds with DNS request 142 in FIG. 1A. The DNS request is provided by an application, such as application 180 in FIG. 1A, by electronically transmitting the DNS request to a DNS client, such as the DNS client 140 in FIG. 1A. In step 344, a ranking of priority for a second set of DNS records is determined. In some cases, the ranking of priority for the second set of DNS records comprises a ranked list or a table specifying the priority of DNS records to be transmitted to an application. The ranking of priority for the second set of DNS records comprises priority information that is stored within a DNS client. In examples, the ranking of priority for the second set of DNS records corresponds with the records priority 152 in FIG. 1A.

In step 346, an IP address for the DNS request is acquired. The DNS request includes a hostname (e.g., www.xyz.com) and the IP address comprises a network address for the hostname. The IP address that is responsive to the DNS request is acquired from a DNS server, such as the DNS server 160 in FIG. 1A. The IP address is acquired by transmitting a DNS request, such as DNS request 143 in FIG. 1A to the DNS server. In step 348, a first set of DNS records associated with the DNS request are acquired. In examples, the first set of DNS records include DNS records corresponding with SMTP mail exchangers (MX), name servers (NS), location information (LOC), pointers for reverse DNS lookups (PTR), transaction key (TKEY), and/or domain name aliases (CNAME).

In step 350, one or more system policies are applied to the first set of DNS records. In one example, the one or more system policies include security policies and redirection policies. The one or more system policies are applied to improve system security by protecting against malware and phishing attacks and to improve system performance by caching frequently retrieved DNS records and IP addresses. In step 352, it is detected that a first DNS record of the first set of DNS records is unrecognized by a DNS client. In this case, the DNS client could be unable to decode or adequately process the first DNS record.

In step 354, a raw packet associated with the first DNS record is identified. In some embodiments, the raw packet is passed through the DNS client in its entirety to the application or is truncated by the DNS client based on the ranking of priority for the second set of DNS records. In some cases, the truncation causes data to be removed at byte boundaries and the structure of the raw packet comprises a wire representation of a DNS query and/or response. In some cases, the raw packet is provided to the application within a DNS response packet that includes a DNS header, associated question section, and a number of response DNS records.

In step 356, a threshold data size for the second set data of DNS records is determined. In one example, the threshold data size is set to 512 bytes. The threshold data size limits the number of DNS records that are transmitted to an application. In some cases, the threshold data size for the second set of DNS records is set by an application directly (e.g., as additional information transmitted along with the records priority) or via a lookup table stored in the DNS client of threshold data sizes for different application identifiers. In some cases, each application sets a threshold for the number of DNS records that are transmitted to the application from the DNS client and a priority ranking for the DNS records that are transmitted to the application from the DNS client.

In step 358, the second set of DNS records is generated from the first set of DNS records using the ranking of priority for the second set of DNS records and the threshold data size. The second set of DNS records includes the first DNS record and the raw packet. In some cases, the second set of DNS records comprises a maximum number of DNS records of the first set of DNS records acquired from a DNS server subject to the threshold data size. In some cases, the DNS records selected for the second set of DNS records comprise the highest ranking DNS records that satisfy the threshold data size. In one example, the first set of DNS records comprises ten DNS records and the second set of DNS records comprises four DNS records corresponding with the four highest ranking DNS records based on the ranking of priority for the second set of DNS records. In step 360, the raw packet, the second set of DNS records, and/or the IP address are transmitted. The second set of DNS records and the IP address are transmitted to the application, and in some cases, correspond with the raw data 156 and the DNS records 154 being transmitted to the application 180 in FIG. 1A.

At least one embodiment of the disclosed technology includes a storage device configured to store priority information for a set of DNS records and one or more processors in communication with the storage device. The one or more processors are configured to receive a DNS request from an application, acquire an IP address for the DNS request, acquire one or more DNS records associated with the DNS request, detect that a first DNS record of the one or more DNS records comprises an unknown DNS record, identify a raw packet associated with the first DNS record, generate a set of DNS records from the one or more DNS records using the priority information for the set of DNS records, and transmit the raw packet, the set of DNS records, and the IP address to the application.

In some cases, the one or more processors are configured acquire the one or more DNS records from a DNS server and detect that the first DNS record is not decodable by a DNS client. The one or more processors may also be configured to receive the one or more DNS records at a DNS client and detect that the first DNS record is unrecognized by the DNS client.

In some cases, the one or more processors are configured receive an application identifier and generate the set of DNS records based on the application identifier.

In some cases, the one or more processors are configured to determine a threshold data size for the set of DNS records and generate the set of DNS records based on the threshold data size for the set of DNS records.

At least one embodiment of the disclosed technology includes a storage device for storing instructions that, when executed, cause the system to perform operations comprising receiving a DNS request from an application; acquiring an IP address for the DNS request; acquiring one or more DNS records associated with the DNS request; detecting that a first DNS record of the one or more DNS records comprises an unknown DNS record, the first DNS record is associated with a raw packet; generating a set of DNS records from the one or more DNS records using priority information for the set of DNS records; and transmitting the raw packet, the set of DNS records, and the IP address to the application.

At least one embodiment of the disclosed technology includes receiving a DNS request from an application;

determining a ranking of priority for a set of DNS records; acquiring an IP address for the DNS request from a DNS server; acquiring one or more DNS records associated with the DNS request from the DNS server; detecting that a first DNS record of the one or more DNS records comprises an unknown DNS record; identifying a raw packet associated with the first DNS record; generating the set of DNS records from the one or more DNS records using the ranking of priority for the set of DNS records; and transmitting the raw packet, the set of DNS records, and the IP address to the application.

In some cases, the detecting that the first DNS record of the one or more DNS records comprises an unknown DNS record includes detecting that the first DNS record is not decodable by a DNS client.

In some cases, the generating the set of DNS records may be performed based on an application identifier that uniquely identifies the application.

In some cases, one or more system policies may be applied to the one or more DNS records prior to transmitting the raw packet, the set of DNS records, and the IP address to the application.

In some cases, a threshold data size for the set of DNS records may be determined and the set of DNS records may be generated based on the threshold data size for the set of DNS records.

At least one embodiment of the disclosed technology includes a storage device configured to store records priority information for a set of DNS records and a processing system in communication with the storage device that is configured to receive a DNS request from an application; acquire an IP address for the DNS request from a DNS server; acquire one or more DNS records associated with the DNS request from the DNS server; detect that a first DNS record of the one or more DNS records comprises a DNS record that is not decodable by the system; identify a raw packet associated with the first DNS record; determine a threshold data size for the set of DNS records based on an application identifier for the application; generate the set of DNS records from the one or more DNS records using the records priority information for the set of DNS records and the threshold data size for the set of DNS records; and transmit the raw packet, the set of DNS records, and the IP address to the application.

At least one embodiment of the disclosed technology includes receiving a DNS request from an application; determining a ranking of priority for a second set of DNS records; acquiring an IP address for the DNS request from a DNS server; acquiring a first set of DNS records associated with the DNS request from the DNS server; detecting that a first DNS record of the first set of DNS records is unrecognized by a DNS client, the first DNS record includes a raw packet; generating the second set of DNS records from the first set of DNS records using the ranking of priority for the second set of DNS records; and transmitting the second set of DNS records and the IP address to the application.

The disclosed technology may be described in the context of computer-executable instructions being executed by a computer or processor. The computer-executable instructions may correspond with portions of computer program code, routines, programs, objects, software components, data structures, or other types of computer-related structures that may be used to perform processes using a computer. Computer program code used for implementing various operations or aspects of the disclosed technology may be developed using one or more programming languages, including an object oriented programming language such as Java or C++, a function programming language such as Lisp, a procedural programming language such as the "C" programming language or Visual Basic, or a dynamic programming language such as Python or JavaScript. In some cases, computer program code or machine-level instructions derived from the computer program code may execute entirely on an end user's computer, partly on an end user's computer, partly on an end user's computer and partly on a remote computer, or entirely on a remote computer or server.

The flowcharts and block diagrams in the figures provide illustrations of the architecture, functionality, and operation of possible implementations of systems, methods, and computer program products according to various aspects of the disclosed technology. In this regard, each step in a flowchart may correspond with a program module or portion of computer program code, which may comprise one or more computer-executable instructions for implementing the specified functionality. In some implementations, the functionality noted within a step may occur out of the order noted in the figures. For example, two steps shown in succession may, in fact, be executed substantially concurrently, or the steps may sometimes be executed in the reverse order, depending upon the functionality involved. In some implementations, steps may be omitted and other steps added without departing from the spirit and scope of the present subject matter. In some implementations, the functionality noted within a step may be implemented using hardware, software, or a combination of hardware and software. As examples, the hardware may include microcontrollers, microprocessors, field programmable gate arrays (FPGAs), and electronic circuitry.

For purposes of this document, the term "processor" may refer to a real hardware processor or a virtual processor, unless expressly stated otherwise. A virtual machine may include one or more virtual hardware devices, such as a virtual processor and a virtual memory in communication with the virtual processor.

For purposes of this document, it should be noted that the dimensions of the various features depicted in the figures may not necessarily be drawn to scale.

For purposes of this document, reference in the specification to "an embodiment," "one embodiment," "some embodiments," "another embodiment," and other variations thereof may be used to describe various features, functions, or structures that are included in at least one or more embodiments and do not necessarily refer to the same embodiment unless the context clearly dictates otherwise.

For purposes of this document, a connection may be a direct connection or an indirect connection (e.g., via another part). In some cases, when an element is referred to as being connected or coupled to another element, the element may be directly connected to the other element or indirectly connected to the other element via intervening elements. When an element is referred to as being directly connected to another element, then there are no intervening elements between the element and the other element.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify or distinguish separate objects.

For purposes of this document, the term "set" of objects may refer to a "set" of one or more of the objects.

For purposes of this document, the phrases "a first object corresponds with a second object" and "a first object corresponds to a second object" may refer to the first object and the second object being equivalent, analogous, or related in character or function.

For purposes of this document, the term "or" should be interpreted in the conjunctive and the disjunctive. A list of items linked with the conjunction "or" should not be read as requiring mutual exclusivity among the items, but rather should be read as "and/or" unless expressly stated otherwise. The terms "at least one," "one or more," and "and/or," as used herein, are open-ended expressions that are both conjunctive and disjunctive in operation. The phrase "A and/or B" covers embodiments having element A alone, element B alone, or elements A and B taken together. The phrase "at least one of A, B, and C" covers embodiments having element A alone, element B alone, element C alone, elements A and B together, elements A and C together, elements B and C together, or elements A, B, and C together. The indefinite articles "a" and "an," as used herein, should typically be interpreted to mean "at least one" or "one or more," unless expressly stated otherwise.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system for handling DNS requests, comprising:
a storage device for storing instructions that, when executed, cause the system to perform operations comprising:
receiving a DNS request from an application;
acquiring an IP address for the DNS request;
acquiring a first set of DNS records associated with the DNS request;
detecting that a first DNS record of the first set of DNS records is unrecognized by a DNS client;
generating a second set of DNS records different from the first set of DNS records using priority information for the second set of DNS records, the second set of DNS records includes the first DNS record; and
transmitting the second set of DNS records and the IP address to the application.

2. The system of claim 1, wherein:
the acquiring the first set of DNS records includes acquiring the first set of DNS records from a DNS server; and
the detecting that the first DNS record is unrecognized by the DNS client includes detecting that the first DNS record is not decodable by the DNS client.

3. The system of claim 1, wherein:
the acquiring the first set of DNS records includes acquiring the first set of DNS records at the DNS client, the first DNS record includes a raw packet.

4. The system of claim 1, wherein
the generating the second set of DNS records includes generating the second set of DNS records based on an application identifier for the application.

5. The system of claim 1, further comprising instructions that, when executed, cause the system to perform operations comprising:
applying one or more system policies to the second set of DNS records prior to transmitting the second set of DNS records to the application.

6. The system of claim 1, wherein:
the generating the second set of DNS records includes generating the second set of DNS records using a machine learning model.

7. The system of claim 1, wherein:
the generating the second set of DNS records includes generating the second set of DNS records based on a threshold data size for the second set of DNS records.

8. The system of claim 1, wherein:
the priority information includes a first priority ranking for the first DNS record and a second priority ranking for a second DNS record of the second set of DNS records, the first priority ranking is greater than the second priority ranking.

9. The system of claim 1, wherein:
the first set of DNS records includes a canonical name record.

10. The system of claim 8, wherein:
the number of records comprising the second set of DNS records is less than the number of records comprising the first set of DNS records.

11. A method for handling DNS requests, comprising:
receiving a DNS request from an application;
determining a ranking of priority for a second set of DNS records;
acquiring an IP address for the DNS request from a DNS server;
acquiring a first set of DNS records associated with the DNS request from the DNS server;
detecting that a first DNS record of the first set of DNS records is unrecognized by a DNS client, the first DNS record includes a raw packet;
generating the second set of DNS records from the first set of DNS records using the ranking of priority for the second set of DNS records; and
transmitting the second set of DNS records and the IP address to the application.

12. The method of claim 11, wherein:
the detecting that the first DNS record is unrecognized by the DNS client includes detecting that the first DNS record is not decodable by the DNS client.

13. The method of claim 11, wherein:
the acquiring the first set of DNS records associated with the DNS request includes acquiring the first set of DNS records at the DNS client; and
the generating the second set of DNS records includes generating the second set of DNS records using a machine learning model.

14. The method of claim 11, wherein:
the generating the second set of DNS records includes generating the second set of DNS records based on an application identifier for the application.

15. The method of claim 11, further comprising:
applying one or more system policies to the first set of DNS records prior to transmitting the second set of DNS records and the IP address to the application.

16. The method of claim 11, wherein:
the second set of DNS records includes the first DNS record; and
the number of records comprising the second set of DNS records is less than the number of records comprising the first set of DNS records.

17. The method of claim 11, wherein:
the generating the second set of DNS records includes generating the second set of DNS records based on a threshold data size for the second set of DNS records.

18. The method of claim 11, further comprising:
determining a maximum number of DNS records to be transferred to the application, a number of DNS records comprising the second set of DNS records does not exceed the maximum number of DNS records.

19. The method of claim 17, wherein:
the raw packet comprises a wire representation of the first DNS record; and
the threshold data size for the second set of DNS records is set based on an application identifier for the application.

20. A system for handling DNS requests, comprising:
a storage device configured to store records priority information for a second set of DNS records; and
a processing system in communication with the storage device that is configured to:
  receive a DNS request from an application;
  acquire an IP address for the DNS request from a DNS server;
  acquire a first set of DNS records associated with the DNS request from the DNS server;
  detect that a first DNS record of the first set of DNS records comprises a DNS record that is not decodable by the system;
  identify a raw packet associated with the first DNS record;
  determine a threshold data size for the second set of DNS records based on an application identifier for the application;
  generate the second set of DNS records from the first set of DNS records using the records priority information for the second set of DNS records and the threshold data size for the second set of DNS records; and
  transmit the raw packet, the second set of DNS records, and the IP address to the application.

\* \* \* \* \*